US008544028B2

(12) United States Patent
Doganata et al.

(10) Patent No.: US 8,544,028 B2
(45) Date of Patent: Sep. 24, 2013

(54) EXTRACTING AND PROCESSING DATA FROM HETEROGENEOUS COMPUTER APPLICATIONS

(75) Inventors: Yurdaer N. Doganata, Hawthorne, NY (US); Szabolcs Rozsnyai, Hawthorne, NY (US); Aleksander Slominski, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/083,924

(22) Filed: Apr. 11, 2011

(65) Prior Publication Data

US 2012/0260265 A1    Oct. 11, 2012

(51) Int. Cl.
*G06F 13/00*    (2006.01)

(52) U.S. Cl.
USPC .......................................... 719/318

(58) Field of Classification Search
USPC .......................................... 719/318
See application file for complete search history.

(56) References Cited

U.S. PATENT DOCUMENTS

| 8,065,257 B2 * | 11/2011 | Kuecuekyan ................... 706/46 |
| 2007/0143330 A1 | 6/2007 | Tang |
| 2008/0208820 A1 * | 8/2008 | Usey et al. ........................ 707/3 |

OTHER PUBLICATIONS

Rose, et al., "A toolbox and use cases for the XML World View," IBM Systems Journal, Apr. 6, 2010, pp. 411-424, vol. 45 Issue 2.

\* cited by examiner

*Primary Examiner* — Andy Ho
(74) *Attorney, Agent, or Firm* — William J. Stock

(57) ABSTRACT

A computer-implemented method, system, and article of manufacture for extracting and processing event data from heterogeneous computer applications. The method includes providing a computer system having software modules for performing the steps of: receiving data related to a first event; identifying a data type of the first event based on data type definitions; selecting a set of extraction rules for extracting an attribute of an event having the identified data type; extracting the first attribute from the first event data based on the set of extraction rules; and mapping the first attribute to an event attribute of a unified structure.

13 Claims, 7 Drawing Sheets

EXTRACTING AND PROCESSING DATA FROM HETEROGENEOUS COMPUTER APPLICATIONS

CROSS-REFERENCE TO RELATED APPLICATIONS

The present application is related to a U.S. application entitled "AUTOMATED CORRELATION DISCOVERY FOR SEMI-STRUCTURED PROCESSES," Ser. No. 13/083,832, filed concurrently herewith, assigned to the same assignee, and the entire contents of which are incorporated by reference herein.

BACKGROUND OF THE INVENTION

The present invention relates generally to methods and systems for monitoring processes in computer systems. More particularly, the present invention relates to extracting and processing event data among heterogeneous computer systems or applications.

In today's business environment, vast amount of business events are generated by independent business applications span across the organization. Since, these applications do not use common data models and common business semantics and formats, the events that are related to each other are not visible and traceable.

In existing technology, traceability in process streams for business or organizational computer applications is typically addressed by providing a common data model at the time of the business application design or by mapping business event data onto a common data model. These approaches, however, are not always efficient or they may be inapplicable to certain current and evolving business applications. In many situations, the amount of data and the complexity of data types used in representing business events make it very costly and time consuming to enable traceability. In order to better track business events and retrieve insight about the operations, the process of correlating streaming events need to be automated.

SUMMARY OF THE INVENTION

According to an aspect of the present invention, a computer-implemented method is provided for extracting and processing event data from heterogeneous computer applications. The method includes: (a) providing a computer system, where the computer system includes software modules embodied on a computer-readable medium, and the software modules include an input receiver module, a data identification module, an extractor module, a mapping module, a data output module, and a data storage module; (b) receiving data related to a first event that is capable of being processed by a first computer application, where the first event data includes at least one attribute ("first attribute"), and the receiving data related to the first event is performed by the input receiver module; (c) identifying a data type of the first event based on data type definitions, where the data type definitions are stored on the data storage module or received by the input receiver module, and the identifying the data type of the first event is performed by the data identification module; (d) selecting a set of extraction rules for extracting an attribute of an event having the identified data type, where the set of extraction rules is stored on the data storage module or received by the input receiver module, and the selecting the set of extraction rules is performed by the extractor module; (e) extracting the first attribute from the first event data based on the set of extraction rules, where the extracting is performed by the extractor module; and (f) mapping the first attribute to an event attribute of a unified structure, where data related to the unified structure event is stored on the data storage module or received by the input receiver module, the mapping is based on a set of rules for mapping an event attribute having the identified data type to an attribute of the unified structure event, and the mapping is performed by the mapping module.

According to another aspect of the present invention, a computer-implemented system is provided for extracting and processing event data from heterogeneous computer applications. The system includes: (a) an input receiver module for receiving data related to a first event, where the first event is capable of being processed by a first computer application, and the first event data includes at least one attribute ("first attribute"); (b) a data identification module for identifying a data type of the first event based on data type definitions, where the data type definitions are stored on the data storage module or received by the input receiver module; (c) an extractor module for selecting a set of extraction rules for extracting an attribute of an event having the identified data type and for extracting the first attribute from the first event data based on the set of extraction rules; (d) a mapping module for mapping the first attribute to an event attribute of a unified structure, where the mapping is based on a set of rules for mapping an event attribute having the identified data type to an attribute of the unified structure event; and (e) a data storage module for storing the set of extraction rules, data related to the unified structure event, and the set of mapping rules.

According to yet another aspect of the present invention, an article of manufacture is provided that includes a computer readable medium having computer readable instructions embodied therein for performing the steps of the computer-implemented method described above.

BRIEF DESCRIPTION OF THE DRAWINGS

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. The following figures are included.

DETAILED DESCRIPTION OF THE PREFERRED EMBODIMENTS

It will be readily understood that the embodiments of the present invention, as generally described and illustrated in the figures herein, may be arranged and designed in a wide variety of different configurations in addition to the described presently preferred embodiments. Thus, the following detailed description of the embodiments of the present invention, as represented in the figures, is not intended to limit the scope of the invention, as claimed, but is merely representative of selected presently preferred embodiments of the invention. The following description is intended only by way of example, and simply illustrates certain selected presently preferred embodiments of the invention as claimed herein.

Systems that support today's globally distributed, rapidly changing and agile businesses are steadily growing in size as well as complexity. They are becoming increasingly federated, loosely coupled, distributed and at the same time generating huge numbers of data events at various levels of granularity. Those events can reflect activities of business computer application processes or supporting information that we refer in general to business entities. Embodiments of the present invention allow for data about the application events to be extracted and processed such that correlations may be formed among the events without using any prior semantic mapping or data transformation.

These business software applications may include a wide range of systems, such as Order Management, Document Management, E-Mail, Export Violation Detection Services, etc., as well as workflow-supported user-driven interactions, such as Process Management System, etc. Applications that are aimed at monitoring and analyzing business processes face the challenge that these business software applications are materialized in different formats, e.g., XML, PDF, JSON, CSV, etc., and with various structures, e.g., XSD, column semantics of CSV files, etc. For instance, a source system may generate artifacts or processes representing customer orders and order id appears as attributes of different business events.

Figure 1:
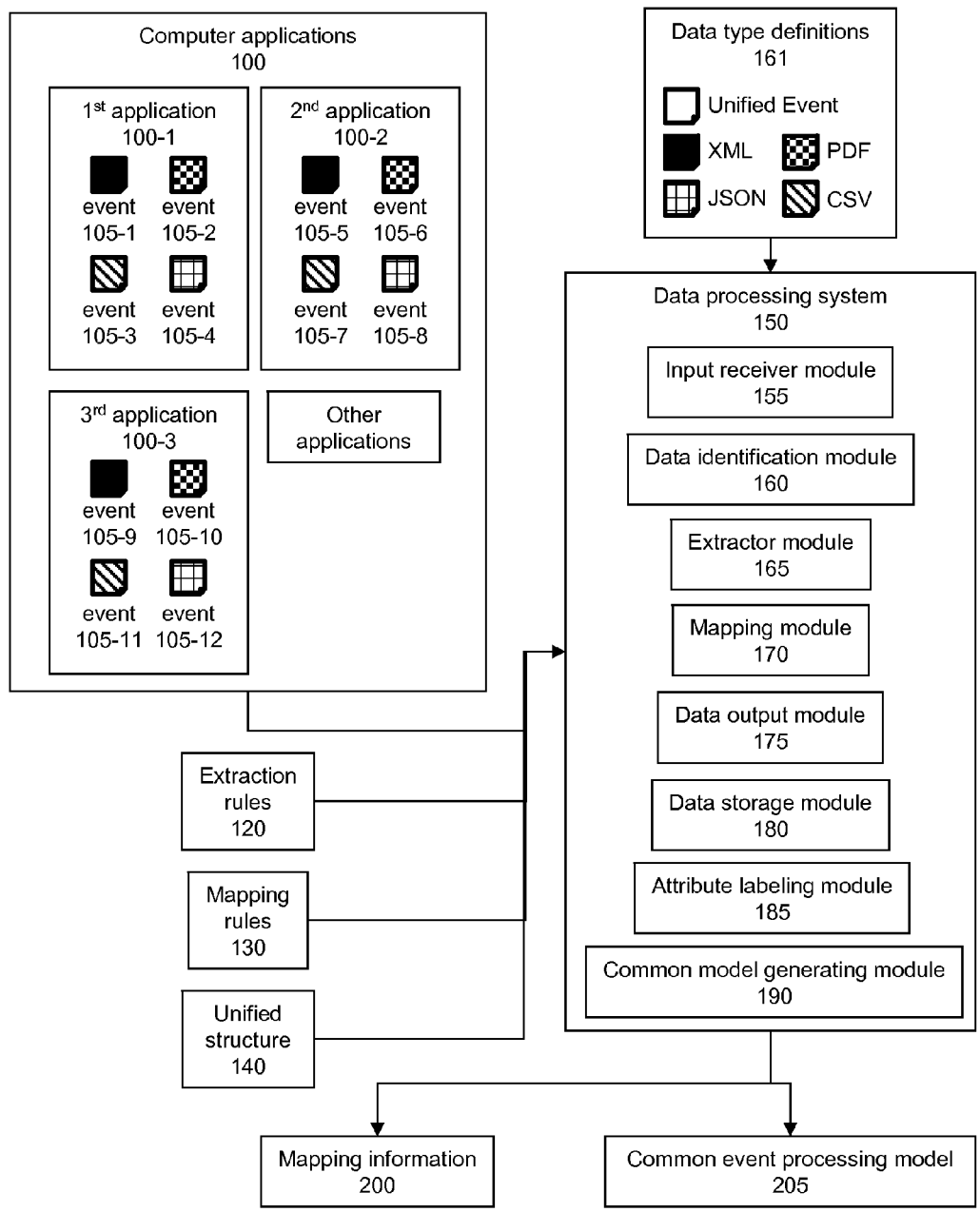
FIG. 1 is a block diagram that illustrates a computer-implemented system for extracting and processing event data from heterogeneous computer applications according to an embodiment of the present invention.

Referring to FIG. 1, a block diagram illustrations a computer-implemented system for extracting and processing event data from heterogeneous computer applications. The system includes: an input receiver module 155, a data identification module 160, an extractor module 165, a mapping module 170, a data output module 175, a data storage module 180, an optional attribute labeling module 185, and an optional common model generating module 190.

Figure 2A:
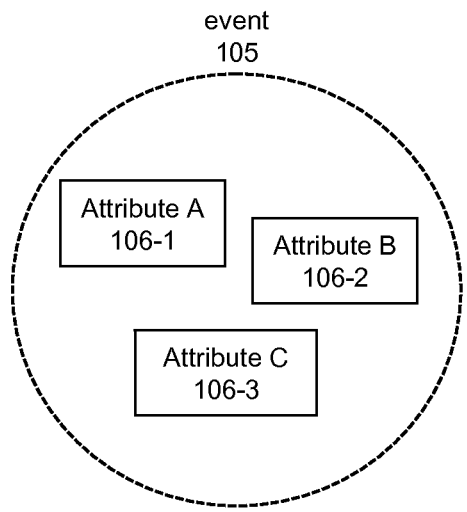
FIG. 2a is a block diagram that illustrates the details of event data according to an embodiment of the present invention.

The input receiver module receives data related to events from various data sources or computer applications. Event data may contain one or more attributes. Referring to FIG. 2a, a block diagram illustrates the details of event data 105 and in FIG. 2b, a block diagram illustrates an example of an event data according to an embodiment of the present invention. However, the system, in performing its data extraction and processing, assumes that no knowledge is provided for the received event data as to the event data type, data format, or structure.

Figure 2B:
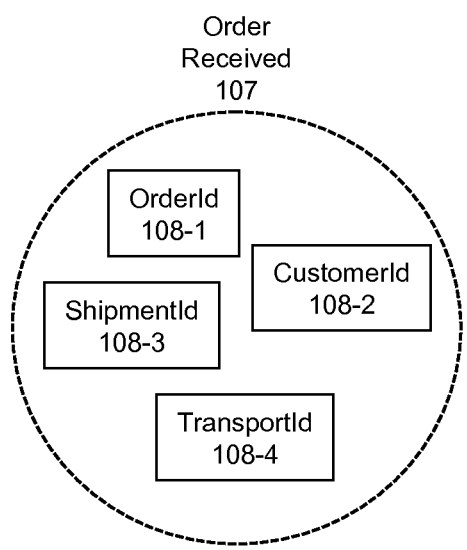
FIG. 2b is a block diagram that illustrates an example of event data according to an embodiment of the present invention.

In FIG. 2a, the event data 105 is of an event that contains several attributes A, B, and C 106-1, 106-2, 106-3. In FIG. 2b, the example event is "OrderReceived" 107. The event contains multiple attributes OrderId, CustomerId, ShipmentId, and TransportId 108-1, 108-2, 108-3, 108-4.

After receiving the event data, the data type is identified by the data identification module. The data type may be either automatically inferenced or semi-manually determined such as by defining rules or definitions that analyze the structure and the content of the event data. An example of such a rule may be "if the event is from an order management system, then it is of type OrderReceived". Referring back to FIG. 1, these data type definitions 161 may be received by the input receiver module or they may be stored on the data storage module.

Using either technique, the events are typed and thus can be grouped. If the type is unknown or not defined then they are marked as an unknown-type. The typing process may be applied at a later point in time and/or the defining rules may also be received by the input receiver module in other embodiments of the present invention.

Figure 3:
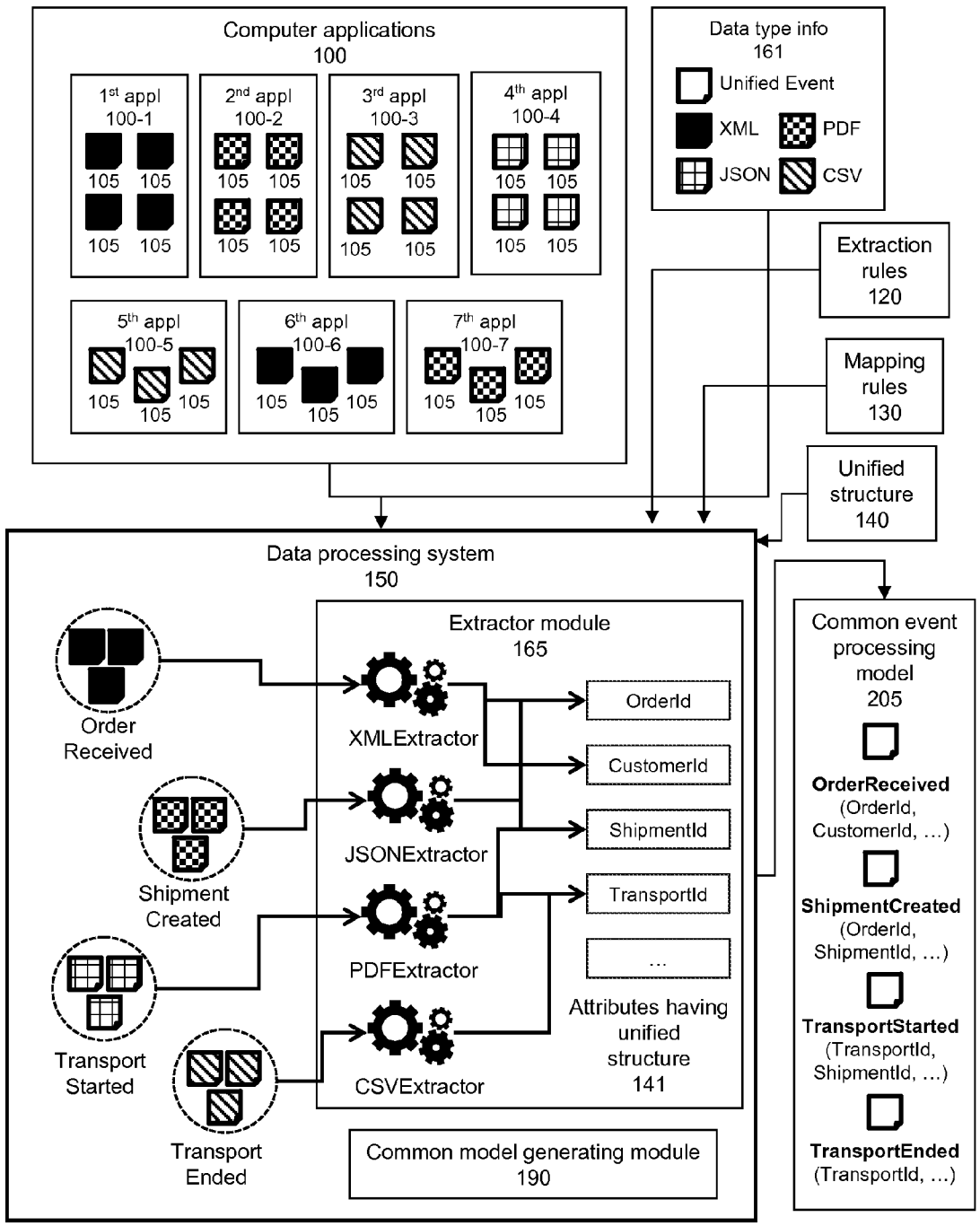
FIG. 3 is a block diagram that illustrates details on the extractor module according to an embodiment of the present invention.

Referring to FIG. 3, a block diagram illustrates details on the extractor module according to an embodiment of the present invention.

In the example shown in FIG. 3, assume that information or a file regarding a product order is outputted by an order management system as plain text and with a format where the attributes, such as an order_id, the customer_number, etc. of an order, are separated by commas (CSV). At a later point in time, the order management system changes and is now outputting order events in the form of an XML document with a certain structure defined by an XSD. In addition, Attributes of the order can be labeled in a different way. For example, instead of the label order_id, the attribute may be relabeled OrderNumber, order_No, OID, etc. Similarly, the customer_number attribute may be relabeled customer_No, Customer_name, CustomerNumber, etc. While the entity of an order has not changed, the data format, structure and labels were significantly altered.

These modifications may occur when underlying systems are upgraded and when data structures are improved, errors are fixed or new components are introduced that add additional data or data types. Interconnecting systems communicating directly with the source is therefore rarely an alternative as every change comes with large integration efforts in the chain of the data consumption. In addition, changing source formats require different extractors that can deal with the enclosed data. So for instance a PDF document might contain attributes that can be extracted with according algorithms.

After the data type has been identified, the extractor module selects a set of extraction rules for extracting the attributes of the event having the identified data type. The extraction rules may be stored on the data storage module or received by the input receiver module.

In the example in FIG. 3, four events are defined: OrderReceived, ShipmentCreated, TransportStarted, and TransportEnded. Each of these events have a different materialization, such as XML, JSON, PDF or PlainText structured as CSV.

In order to create a unified abstraction of the four events originating from various business applications, we need to extract and define the attributes of each of the events by analyzing the raw event data. An attribute extraction algorithm or set of rules can be applied to extract and map the attributes to attributes of a unified structure. Information on the unified structure may be stored in the data storage module or received by the input receiver module.

The extraction rules define what condition must be fulfilled to apply a particular extractor. For instance, if the data type of an event is OrderReceived and the MIME-type is XML then an XPathExtractor must be applied. The attribute extractor module receives the rules on how to deal with XML formats and thus how to extract a particular attribute such as OrderNumber in order to map it to the corresponding business entity attribute or unified structure. If a business application undergoes a change, and its corresponding events change in their materialization, then an additional rule with the corresponding extractor may be added for that particular business entity attribute. For example, OrderNumber in XML and order_id in CSV are both mapped on OrderId in the unified structure.

Rules on mapping 130 can be part of the extraction rules 120 or it can be a separate set or rules that are stored in the data storage module or received by the input receiver module.

Figure 4:
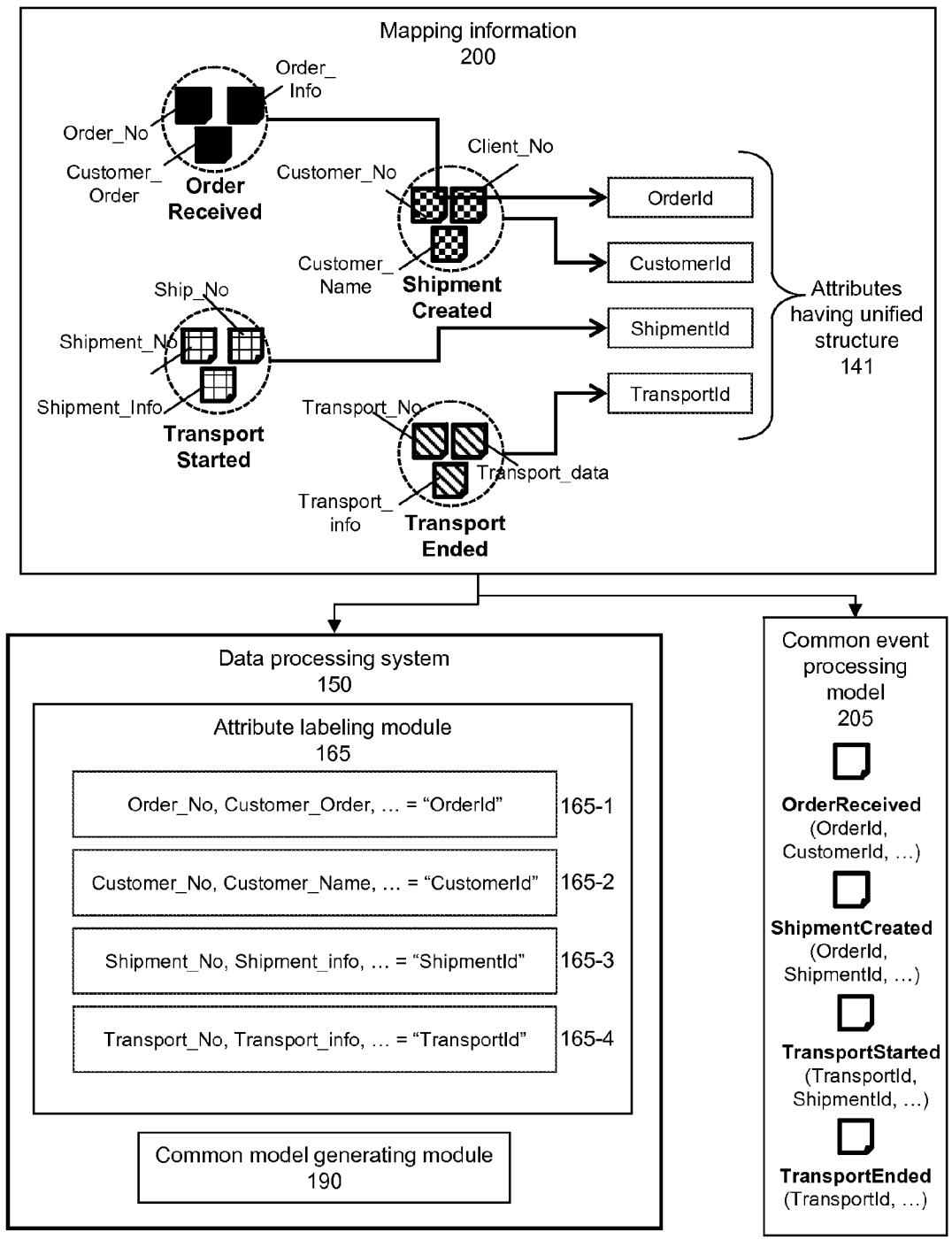
FIG. 4 is a block diagram that illustrates details of the attribute labeling module according to an embodiment of the present invention.

Referring to FIG. 4, a block diagram shows details of the attribute labeling module. Using information about the mapping between the attributes 200, the attribute labeling module 165 labels the extracted attributes. For instance, the attributes Order_No, Customer_Order, etc. are labeled "OrderId" 165-1.

The labeled attributes can be transmitted by the data output module 175 (see FIG. 1) to a system for correlating event data, where the system determines correlations between a first attribute of an event from a particular computer application and another attribute of another event from a second computer application. (See also related U.S. patent application, entitled "AUTOMATED CORRELATION DISCOVERY FOR SEMI-STRUCTURED PROCESSES,".

Moreover, the common model generating module 190 may utilize the mapping information 200 to define a common event processing model 205. This model 205 can be used by any of the computer applications 100-1, 100-2, 100-3, etc. (shown in FIGS. 1 and 3.)

Referring back to FIG. 3, in addition to mapping the attributes of an event from a particular computer application, 100-1, 100-2, 100-3, etc., attributes having a unified structure 141, the attributes of an event from one computer application, e.g., the first application 100-1, may be mapped to the attributes of another event from a second computer application 100-2. The received mapping rules 130 may contain rules on how to mapping from one application to the next. After the attributes are mapped, the second computer application utilizes data from the events of the first application 100-1 in order to process its own application-specific event.

Figure 5:
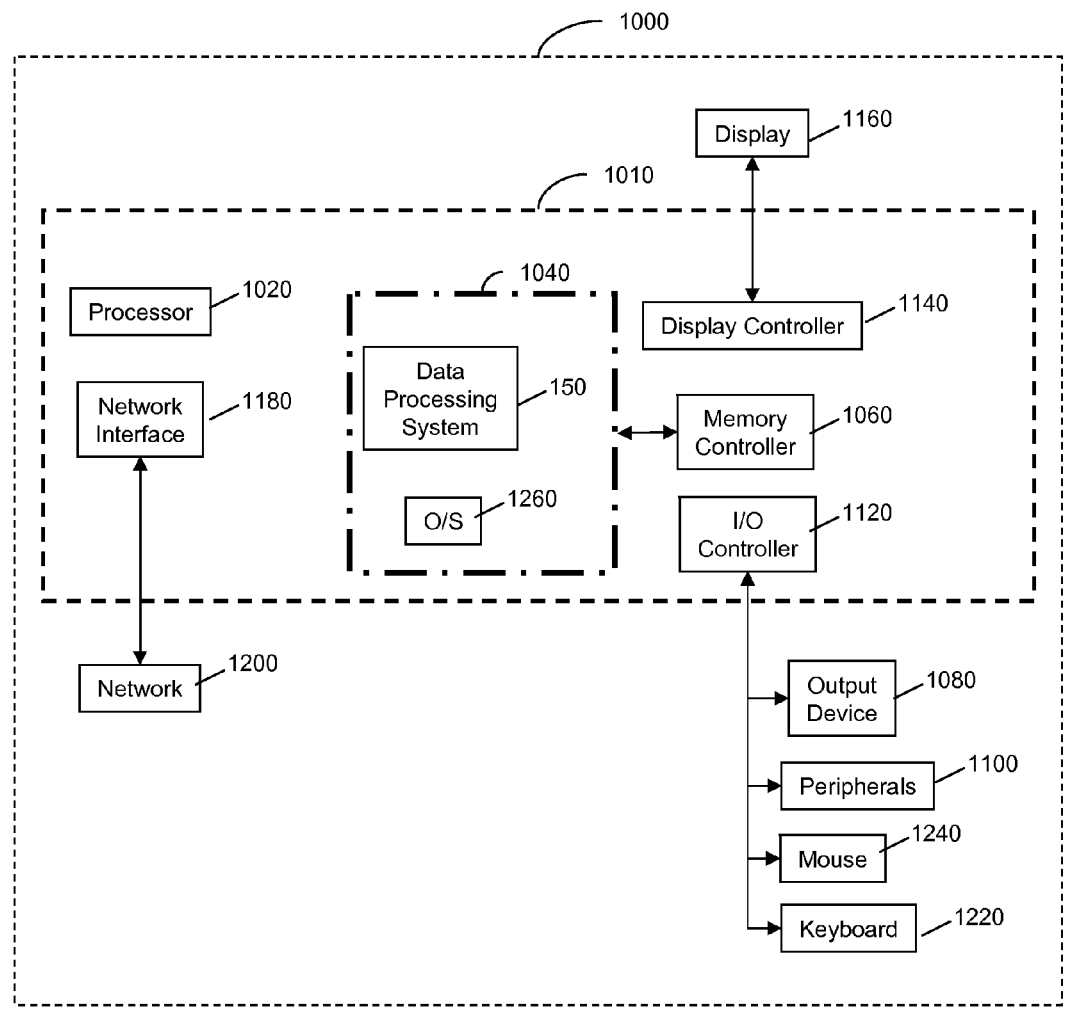
FIG. 5 is a block diagram that illustrates a computer-implemented system that includes the system for extracting and processing event data from heterogeneous computer applications according to an embodiment of the present invention.

FIG. 5 is a block diagram that illustrates a computer-implemented system that includes the system 150 for extracting and processing event data from heterogeneous computer applications according to an embodiment of the present invention.

As can be appreciated, the computing system 1000 may include a computing device, including but not limited to, a desktop computer, a laptop, a server, a portable handheld device, or any other electronic device. For ease of the discussion, an embodiment of the invention will be discussed in the context of the computer 1010.

The computer 1010 is shown to include a processor 1020, memory 1040 coupled to a memory controller 1060, one or more input and/or output (I/O) devices, peripherals 1080, 1100 that are communicatively coupled via a local input/output controller 1120, and a display controller 1180 coupled to a display 1160. In an exemplary embodiment, the system 1000 can further include a network interface 1140 for coupling to a network 1200. The network 1200 transmits and receives data between the computer 1010 and external systems. In an exemplary embodiment, a conventional keyboard 1220 and mouse 1240 can be coupled to the input/output controller 1200.

In various embodiments of the present invention, the memory 1040 stores instructions that can be executed by the processor 1020. The instructions stored in memory 1040 may include one or more separate programs, each of which comprises an ordered listing of executable instructions for implementing logical functions. In the example of FIG. 5, the instructions stored in the memory 1040 include at least a suitable operating system (OS) 1260 and data processing system 150. The operating system 1260 essentially controls the execution of other computer programs and provides scheduling, input-output control, file and data management, memory management, and communication control and related services.

When the computer 1010 is in operation, the processor 1020 is configured to execute the instructions stored within the memory 1040, to communicate data to and from the memory 1040, and to generally control operations of the computer 1010 pursuant to the instructions. The processor 1020 can be any custom made or commercially available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the data processing system 150 according to embodiments of the present invention. In various embodiments, the data processing system 150 of the present invention is stored in the memory 1040 (as shown), is executed from a portable storage device (e.g., CD-ROM, Diskette, FlashDrive, etc.) (not shown), and/or is run from a remote location such as from a central server (not shown). The data processing system 150 may be a software application that carries out a process such as described below with reference to FIG. 6. In some embodiments of the present invention, memory 1040 also stores data, such as received event data 105, extraction rules 120, mapping rules 130, unified structure 140, or data type definitions 161 that are shown in FIG. 1.

Figure 6:
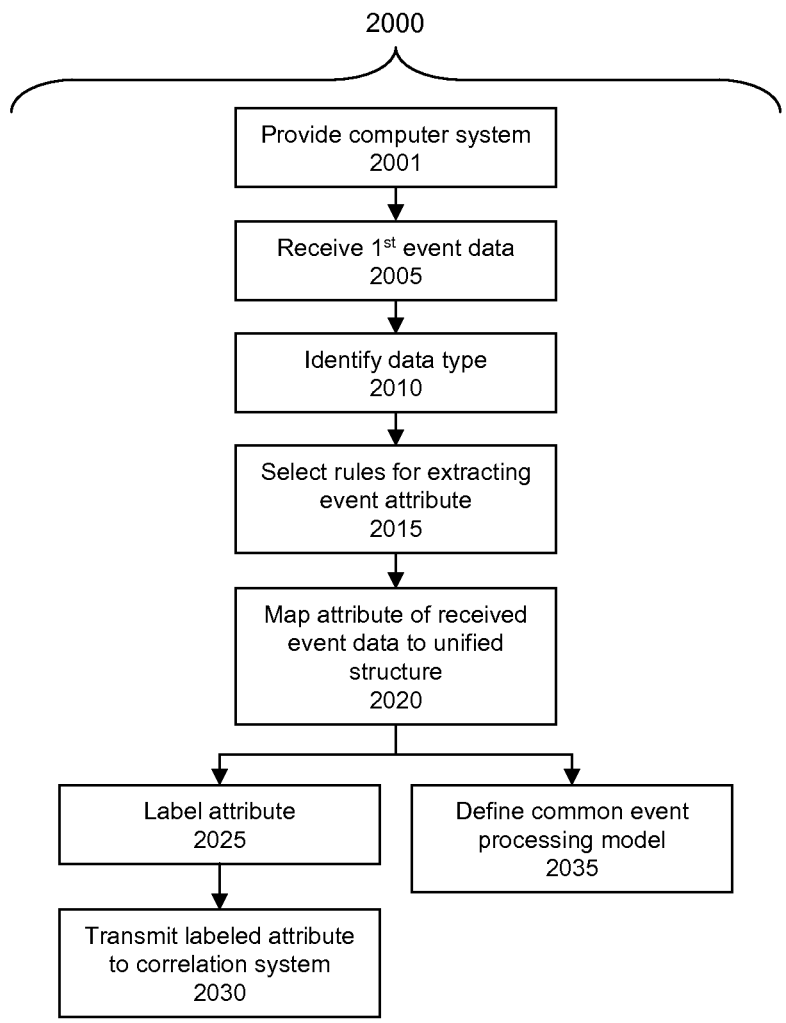
FIG. 6 is a flow chart that illustrates a computer-implemented method of extracting and processing event data from heterogeneous computer applications according to an embodiment of the present invention.

According to another embodiment of the present invention, a computer-implemented method is provided for extracting and processing event data from heterogeneous computer applications according to an embodiment of the present invention. Referring to FIG. 6, the method 2000 begins at step 2001, where it provides a computer system that includes various software modules that are embodied on a computer-readable medium. The software modules include an input receiver module, a data identification module, an extractor module, a mapping module, a data output module, a data storage module, an optional attribute labeling module, and an optional common model generating module.

At step 2005, the input receiver module receives data related to at least one event ("a first event") that is capable of being processed by a first computer application. The first event data includes at least one attribute ("first attribute").

At step 2010, the data identification module identifies a data type of the first event based on data type definitions. The data type definitions are stored on the data storage module or received by the input receiver module.

At step 2015, the extractor module selects a set of extraction rules. The extractor module uses these extraction rules to extract an attribute of an event of the identified data type. The extraction rules may be stored in the data storage module or received by the input receiver module.

At step 2020, the mapping module maps the first attribute to an attribute having a unified structure. Data regarding the unified structure and the unified events of the structure may be stored on the data storage module or received by the input receiver module. The mapping is based on a set of rules for mapping an event attribute having the identified data type to an attribute of a unified structure event.

At step 2025, the provided system may further include an optional attribute labeling module that labels the first attribute after it has been mapped to the unified event attribute.

At step 2030, the data output module may further transmit the labeled attribute after performance of step 2025 to an event correlation system so that the correlation system. The correlation system uses the labeled attribute to analyze the data relating to the first event to determine if there is any correlation between the first event and another event of a second computer application.

At step 2035, the provided system may further include a common model generating module that defines a common event processing model. The common model generating module uses the information about the mapping between the first attribute and the unified event attribute to define this model.

Figure 7:
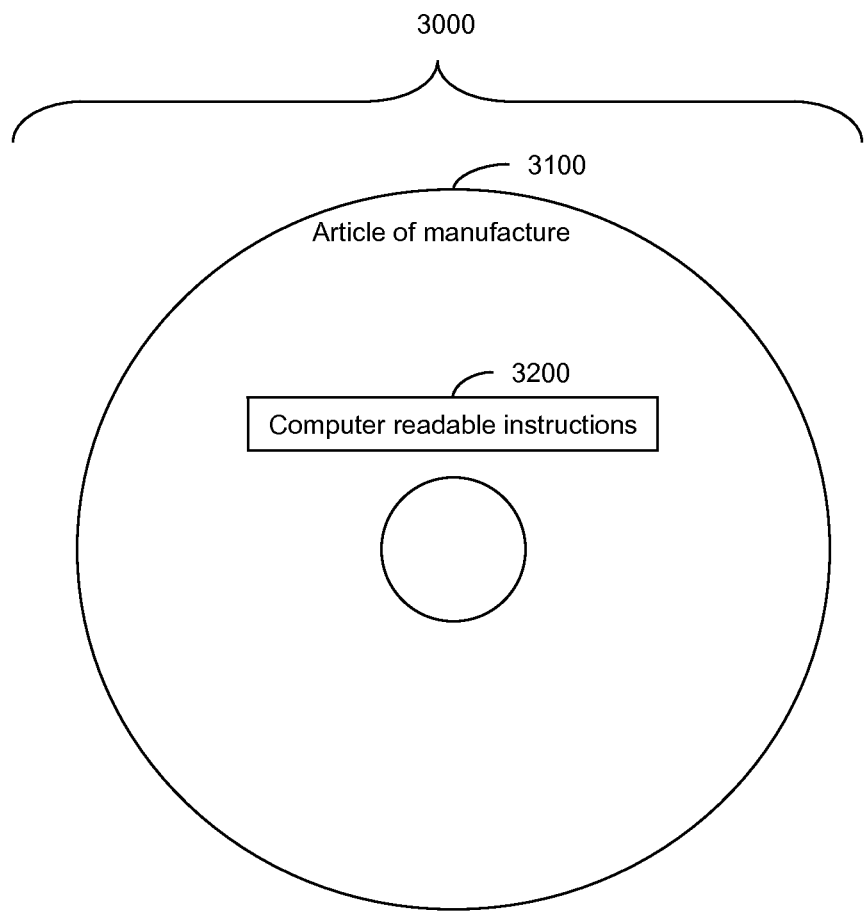
FIG. 7 is an illustration of an article of manufacture for carrying out the steps of the methods according to embodiments of the present invention.

According to a further embodiment of the present invention, an article of manufacture is provided that includes a computer readable medium having computer readable instructions embodied therein for performing the steps of the computer-implemented method described above. FIG. 7 illustrates the article of manufacture 3100 that includes a computer readable medium having computer readable instructions 3200 for carrying out the steps of the method 2000 discussed above with reference to FIG. 6.

A combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of extracting and processing event data from heterogeneous computer applications, said method comprising:

providing a computer system, wherein said computer system comprises software modules embodied on a computer-readable medium, and said software modules comprise an input receiver module, a data identification module, an extractor module, a mapping module, a data output module, and a data storage module;

receiving data related to a first event that is capable of being processed by a first computer application, wherein said first event data includes at least one first attribute, and said receiving data related to said first event is performed by said input receiver module;

identifying a data type of said first event based on data type definitions, wherein said data type definitions are stored on said data storage module or received by said input receiver module, and said identifying said data type of said first event is performed by said data identification module;

selecting a set of extraction rules for extracting an attribute of an event having said identified data type, wherein said set of extraction rules is stored on said data storage module or received by said input receiver module, and said selecting said set of extraction rules is performed by said extractor module;

extracting said first attribute from said first event data based on said set of extraction rules, wherein said extracting is performed by said extractor module; and mapping said first attribute to an event attribute of a unified structure, wherein data related to said unified structure event is stored on said data storage module or received by said input receiver module, said mapping is based on a set of rules for mapping an event attribute having said identified data type to an attribute of said unified structure event, and said mapping is performed by said mapping module.

2. The method according to claim 1, wherein:
said computer system further comprises an attribute labeling module; and
said method further comprises labeling said first attribute based on said information about said mapping between said first attribute and said unified event attribute, wherein said labeling is performed by said attribute labeling module.

3. The method according to claim 2, further comprising:
transmitting said labeled first attribute to an event correlation system for determining a set of correlated data among said first computer application and a second computer application, wherein said transmitting is performed by said data output module.

4. The method according to claim 1, wherein:
said computer system further comprises a common model generating module; and
said method further comprises using information about said mapping between said first attribute and said unified event attribute for defining a common event processing model for use by said first computer application and another computer application, wherein said defining is performed by said common model generating module.

5. A computer-implemented system for extracting and processing event data from heterogeneous computer applications, said system comprising:
a memory;
a processor communicatively coupled to the memory;
an input receiver module communicatively coupled to the memory and the processor, wherein the input receiver module is configured to receive data related to a first event, wherein said first event is capable of being processed by a first computer application, and said first event data includes at least one first attribute;
a data identification module communicatively coupled to the memory and the processor, wherein the data indentification module is configured to identify a data type of said first event based on data type definitions, wherein said data type definitions are stored on a data storage module or received by said input receiver module;

an extractor module communicatively coupled to the memory and the processor, wherein the extractor module is configured to select a set of extraction rules for extracting an attribute of an event having said identified data type and configured to extract said first attribute from said first event data based on said set of extraction rules;

a mapping module communicatively coupled to the memory and the processor, wherein the mapping module is configured to map said first attribute to an event attribute of a unified structure, wherein said mapping is based on a set of rules for mapping an event attribute having said identified data type to an attribute of said unified structure event; and a data storage module communicatively coupled to the memory and the processor, wherein the data storage module is configured to store said set of extraction rules, data related to said unified structure event, and said set of mapping rules.

6. The system according to claim 5, wherein:
said computer system further comprises an attribute labeling model module communicatively coupled to the memory and the processor, wherein the attribute labeling module is configured to label said first attribute based on said information about said mapping between said first attribute and said unified event attribute.

7. The system according to claim 6, wherein:
said computer system comprises a data output module communicatively coupled to the memory and the processor, wherein the mapping module is configured to transmit said labeled first attribute to an event correlation system for determining a set of correlated data among said first computer application and a second computer application.

8. The system according to claim 5, wherein:
said computer system further comprises a common model generating module communicatively coupled to the memory and the processor, wherein the mapping module is configured to define a common event processing model for use by said first computer application and another computer application, wherein said defining is based on information about said mapping between said first attribute and said unified event attribute.

9. The system according to claim 5, wherein:
said input receiver module is further configured to receive said set of extraction rules, said data related to said unified structure event, or said set of mapping rules from a data source or a user; and
said data storage module is further configured to store said set of extraction rules, said data related to said unified structure event, or said set of mapping rules.

10. An article of manufacture comprising a computer readable storage medium having computer readable instructions embodied therein that, when executed by a computer, implements a method of extracting and processing event data from heterogeneous computer applications, said method comprising:
receiving data related to a first event that is capable of being processed by a first computer application, wherein said first event data includes at least one first attribute;
identifying a data type of said first event based on data type definitions, wherein said data type definitions are stored on said data storage module or received by said input receiver module;

selecting a set of extraction rules for extracting an attribute of an event having said identified data type;

extracting said first attribute from said first event data based on said set of extraction rules; and mapping said first attribute to an event attribute of a unified structure, wherein data related to said unified structure event is stored on said data storage module, said mapping is based on a set of rules for mapping an event attribute having said identified data type to an attribute of said unified structure event.

11. The article of manufacture according to claim 10, wherein said method further comprises labeling said first attribute based on said information about said mapping between said first attribute and said unified event attribute.

12. The article of manufacture according to claim 11, wherein said method further comprises:

transmitting said labeled first attribute to an event correlation system for determining a set of correlated data among said first computer application and a second computer application.

13. The article of manufacture according to claim 10, wherein:

said method further comprises using information about said mapping between said first attribute and said unified event attribute for defining a common event processing model for use by said first computer application and another computer application.

* * * * *